(12) United States Patent
Valko et al.

(10) Patent No.: US 7,965,695 B2
(45) Date of Patent: Jun. 21, 2011

(54) METHOD AND APPARATUS FOR ROUTING A PACKET IN MOBILE IP SYSTEM

(75) Inventors: Andras Valko, Budapest (HU); Zoltan Turanyi, Szentendre (HU); Csaba Keszei, Budapest (HU); Katsutoshi Nishida, Tokyo (JP); Shinichi Isobe, Tokyo (JP)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 12/376,930

(22) PCT Filed: Aug. 9, 2006

(86) PCT No.: PCT/JP2006/316073
§ 371 (c)(1),
(2), (4) Date: Mar. 24, 2010

(87) PCT Pub. No.: WO2008/018153
PCT Pub. Date: Feb. 14, 2008

(65) Prior Publication Data
US 2010/0182917 A1 Jul. 22, 2010

(51) Int. Cl.
*H04W 4/00* (2009.01)

(52) U.S. Cl. ...................................... 370/338; 709/239
(58) Field of Classification Search ................... 370/223, 370/224, 227, 238, 338, 401; 709/239, 241, 709/242; 455/410, 411
See application file for complete search history.

(56) References Cited

U.S. PATENT DOCUMENTS

| 2004/0114558 A1* | 6/2004 | Krishnamurthi et al. ..... 370/338 |
| 2005/0259631 A1* | 11/2005 | Rajahalme .................... 370/351 |
| 2006/0018291 A1 | 1/2006 | Patel et al. |

* cited by examiner

*Primary Examiner* — Ricky Ngo
*Assistant Examiner* — Kan Yuen

(57) ABSTRACT

The system includes a mobile node (101) communicating with a correspondent node (102), a home agent node (131) managing the mobile node (101), a proxy node (121) being located closer to the mobile node (101) than the home agent node (131) and relaying the packets from the mobile node (101) to the home agent node (131), and a routing manager (141) managing a route of the packets. The proxy node (121) detects a trigger of a packet route optimization and notifies the routing manager (141). The proxy node (121) establishes the optimized routing path according to a command received from the routing manager (141) and routes the packets through the established routing path using a secure method.

14 Claims, 6 Drawing Sheets

METHOD AND APPARATUS FOR ROUTING A PACKET IN MOBILE IP SYSTEM

TECHNICAL FIELD

The invention relates to a method, apparatus and system to preferably route a packet via an IP network, and more particularly to a proxy node having a packet routing optimization function and a routing address securing function.

BACKGROUND ART

The IP-based IMT (International Mobile Telecommunication) network platform ($IP^2$ from now on) is a network architecture that supports terminal mobility with both route optimization and location privacy [T. Okagawa, M. Jo, K. Nishida, A. Miura, "IP Packet Routing Mechanism Based on Mobility Management in IP-based IMT Network Platform," ICIN 2003, March 2003.] Fundamental to $IP^2$ is the separation of the Network Control Platform (NCPF) and the IP Backbone (IP-BB). The NCPF controls the IP-BB. The IP-BB comprises IP routers with additional packet processing features, such as address switching. The NCPF comprises signaling servers that command the IP-BE entities intelligently.

Mobile terminals (or mobile nodes, MN) are assigned permanent terminal identifiers that take the form of an IP address. In addition MNs are assigned a routing address by the $IP^2$ access router ($IP^2AR$). In basic $IP^2$ the mobile terminal is attached to an $IP^2AR$. The routing address is specific to the location of the MN, and to support location privacy it shall not be revealed to any other MNs. When the MN moves to another $IP^2AR$, a new routing address is allocated to the MN from the pool of routing addresses available at the new $IP^2AR$. The binding between the MN's terminal identifier (IPha, as of "IP home address") and its routing address (IPra, as of "IP routing address") is communicated to the NCPF by the $IP^2AR$.

When a MN (MN1) wishes to send a packet to another MN (MN2) it uses MN2's IPha as destination address in the packet and transmits the packet to its $IP^2AR$ ($IP^2AR2$). $IP^2AR1$ (defined as the sending $IP^2AR$) detects that the packet is addressed to an $IP^2$ MN and queries the NCPF about the location of MN2. The NCPF responds with the IPra of MN2, stored in AR1, along with the IPha of MN2. Then, the destination address of the packet (IPha of MN2) is replaced to the IPra of MN2. This operation is referred to as address switching (optionally, the source address of the packet can also be replaced to the IPra of MN1). The packet is then delivered using traditional IP forwarding to the node that owns the IPra of MN2. The node is $IP^2AR2$. $IP^2AR2$ (defined as the receiving $IP^2AR$) then replaces the destination (and optionally the source) address of the packet to the IPha of MN2 and delivers the packet to MN2.

An important function of $IP^2$ is $IP^2AR$ notification. Whenever MN2 moves to a new $IP^2AR$ (probably as a result of IP handover), the new $IP^2AR$ allocates a new IPra for MN2 and the NCPF is updated with this new IPra. Then the NCPF notifies all $IP^2ARs$ that have MNs that send packets to MN2. As a result, sender $IP^2ARs$ will send MN2's packets to the new location.

Figure 1:
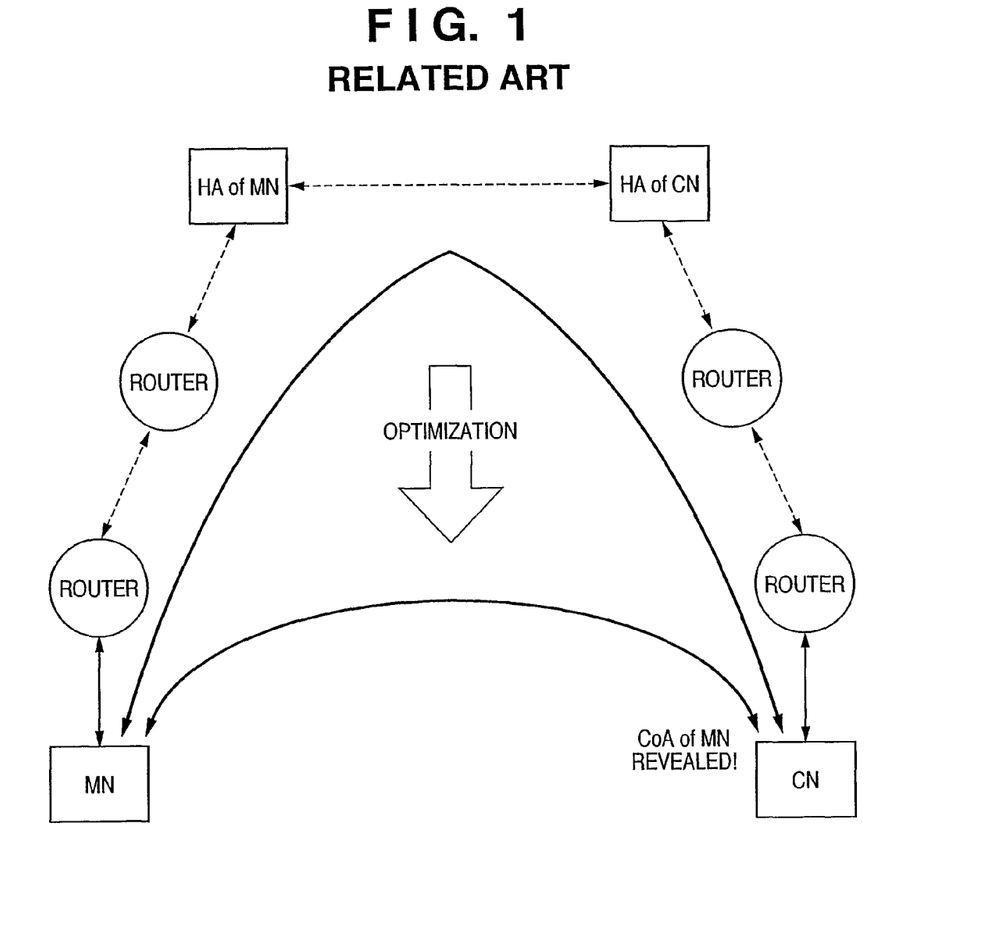
FIG. 1 shows a basic Mobile IP system.

FIG. 1 shows a basic Mobile IP system. Mobile IP version 6 (MIP from now on) is an Internet Engineering Task Force (IETF) defined method for handling IP node mobility [D. Johnson, et al, "RFC 3775: Mobility Support in IPv6", June 2004, IETF]. All MIP aware MNs have a Home Agent (HA) and a permanent Home IP Address. The Home IP Address is topologically correct at (i.e., routed towards) the HA. From the MN's perspective this address is similar to the IPha defined in the $IP^2$. Both addresses are unique and permanent identifiers of the given MN. From now on, the term IPha will be also referred to as the MIP Home IP Address of the terminal.

An IP subnet, to which a MN can be attached, will be referred as a "Visited Network" (VN). The MN's HA is located outside of any possible VNs. When an MN is located in a VN the MN cannot use its IPha as a valid IP address since the IPha is topologically incorrect within the VN. For this reason, the MN configures a Care of Address (CoA) using a valid local prefix. The CoA can be used to send and receive IP packets as long as the MN stays in the same visited IP network. Changing the VN will result in IP handover. The term Correspondent Node (CN) is used to denote the IP host that the MN is communicating with. One MN may have multiple CNs at the same time, and CNs can themselves be mobile.

A MIP enabled MN can choose between two kinds of communication forms to maintain session continuity in case of IP mobility. In the first case all traffic between the CN and the MN is sent through the HA using bi-directional tunneling. The MN updates its HA whenever the MN's CoA has been changed using Binding Update (BU) messages. The HA tunnels all IP packets arrived to the MN's IPha using the MN's actual CoA. Similarly, the MN tunnels all its transmitted packets to the HA, using IPha as the inner source IP address. The HA decapsulates the packets and transmits them towards their ultimate destination. This form of communication enables location privacy if the HA is trusted by the MN. However, one drawback of this mode of communication is route sub-optimality: all packets need to, go through the Home Agent.

The second way of communication in MIP is route optimization. Route optimization enables packets to travel between the MN and the CN directly without visiting the HA. It is performed in an end-to-end fashion by directly transmitting BUs between the MN and the CN. This action breaks location privacy since the location of a MN (the CoA, which is topologically specific) is revealed to the CN.

Route optimization (second case) in MIP is done in an end-to-end fashion. The MN enables route optimization by sending a BU message to its CN. This BU message contains MN's CoA. From this point a NIP aware CN and MN can directly exchange IP packets using the CoA as source or destination address and putting the MN's IPha as a Home Address Option into the IP headers in order to identify the MN. Such packets are sent using the optimal route.

Figure 2:
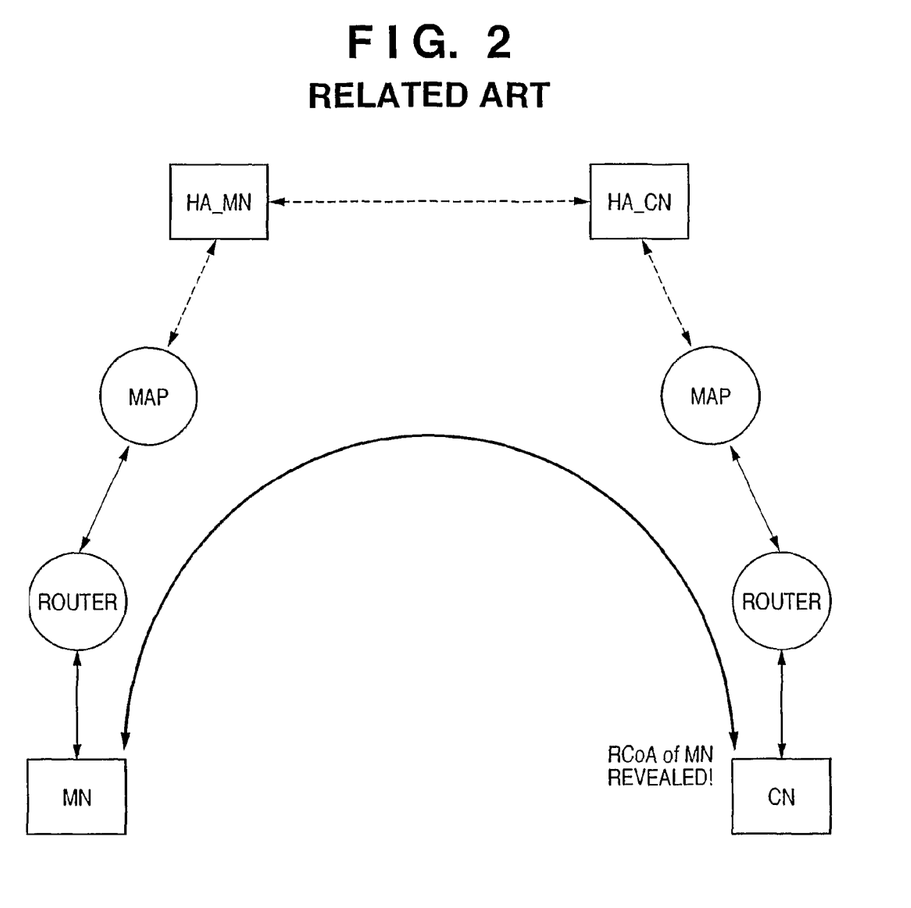
FIG. 2 shows a Hierarchical Mobile IP system.

FIG. 2 shows a Hierarchical Mobile IP system. Hierarchical Mobile IP (HMIP) [H. Soliman, et al, "Hierarchical Mobile IPv6 mobility management (HMIPv6)", 16 Jun. 2004, IETF Draft] introduces a Mobility Anchor Point (MAP), which serves as "local" HA, adding a new hierarchy level to the MIP system. MNs exact point of attachment to the IP network is characterized by a CoA configured at its current link. This IP address is referred to as the Local Care-of-Address (LCoA). HMIP aware MNs can update their MAPs using the LCoA in case of IP handovers. This is beneficial when the MAP is topologically close to the moving MN and its HA and the CNs are far away. In this case, a Regional Care-of-Address (RCoA) is configured at the MAP and used instead of the LCoA for those nodes (i.e., the HA and CNs), which are far away from the MN. All IP handovers "under" the same MAP are not visible to nodes if the MN uses its RCoA as a CoA. Additionally the CNs cannot learn the exact location of the MN, but the approximate location is revealed via the RCoA.

SUMMARY

The problem, which the present invention tackles; is that the IETF standard NIP system does not allow location privacy in conjunction with route optimization.

Thus, the present invention provides some solutions to the problem. According to one aspect of the present invention, the $IP^2$ architecture is combined with the MIP/HMIP system.

According to another aspect of the present invention, a method, an apparatus and a system to optimally solve the problem are provided. For instance, the system includes a mobile node communicating with a correspondent node, a home agent node managing the mobile node and relaying packets sent from the mobile node to the correspondent node, a proxy node being located closer to the mobile node than the home agent node and relaying the packets from the mobile node to the home agent node, and a routing manager managing the route of packets.

The prosy node including:

a detection unit which detects a trigger for a packet route optimization; a notification unit which notifies the routing manager of the detected trigger;

a route establishing unit which establishes the optimized routing path according to a command received from the routing manager;

a securing unit which secures a routing address for the packets, the routing address is dynamically allocated to the mobile node; and a routing unit which routes the packets secured by the securing unit to the correspondent node through the established routing path.

Other features and advantages of the present invention will be apparent from the following descriptions taken in conjunction with the accompanying drawings, in which like reference characters designate the same or similar parts throughout the figures thereof.

BRIEF DESCRIPTION OF DRAWINGS

A more reasonable understanding of the method, apparatus and system of the present invention may be obtained by reference to the following detailed description when taken in conjunction with the accompanying drawings wherein.

DETAILED DESCRIPTION OF THE INVENTION

Through the specification, the terms "optimization", "optimize", and "optimal" are used to emphasize that a newly established routing path is shorter than an old routing path. Sometimes the old routing path means a route via a mobile node's home agent.

Figure 3:
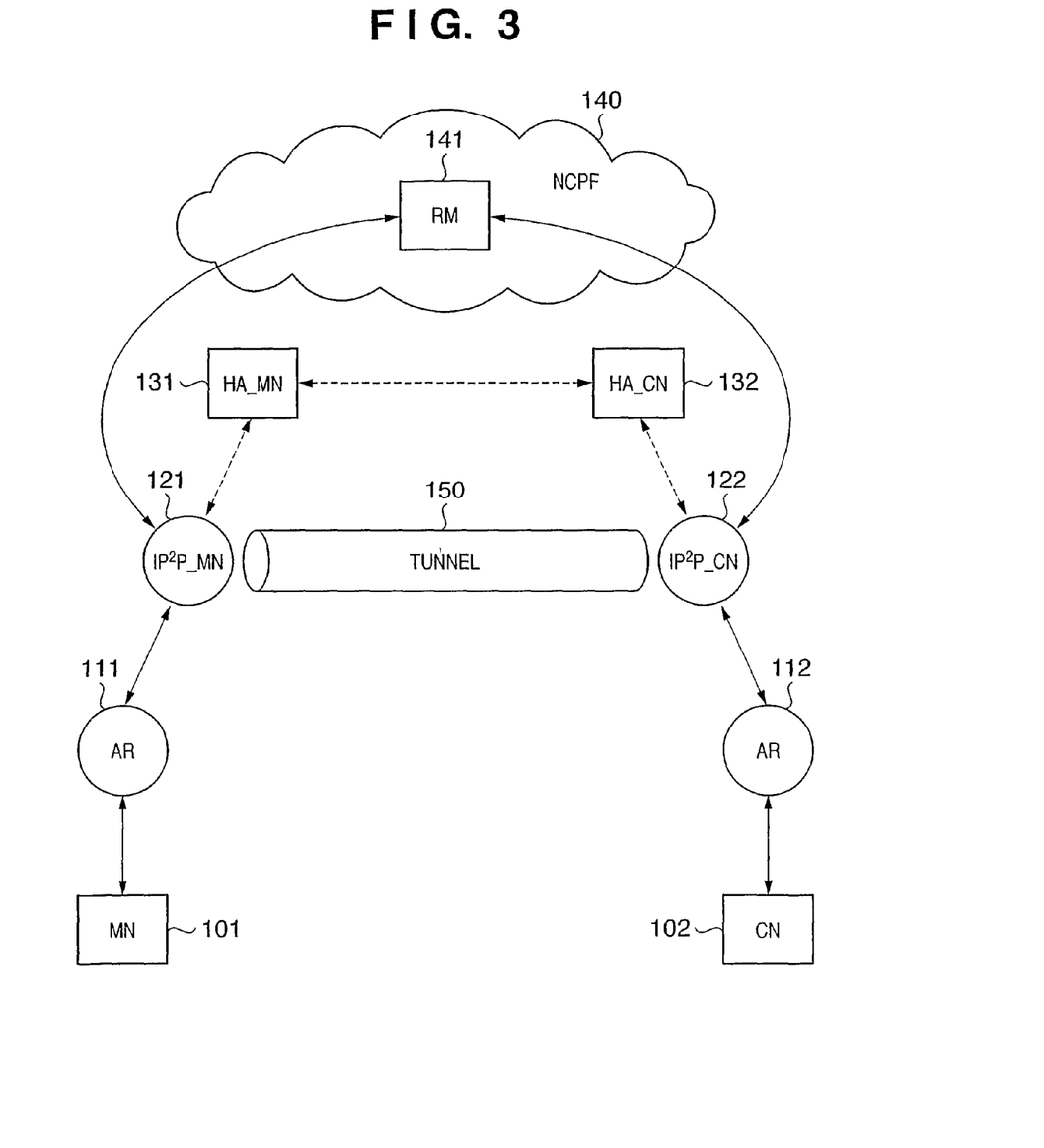
FIG. 3 shows overview of an exemplary mobile communication system to which the present invention is preferably applied.

FIG. 3 is an overview of an exemplary mobile communication system to which the present invention is preferably applied. In FIG. 3, number 101 denotes an exemplary mobile node (MN). Correspondent node (CN) 102 is communicating with MN 101. CN 102 can be a fixed or a mobile node. AR 111 and AR 112 are access routers. Even though only two access routers are shown in FIG. 3, it is clear that there may be much more access routers in a practical network.

$IP^2P\_MN$ 121 is a proxy node for MN 101. $IP^2P\_CN$ 122 is a proxy node for CN 102. The proxy node is placed into any IP node where all IP traffic of a given MN is visible. The proxy node is explicitly notified about a newly attached MN. One example is Authentication Authorization and Accounting (AAA) signalling or the like. The proxy node has as its function to de-capsulate IP packets encapsulated by the MN. The proxy node also has as its function to reproduce an encapsulation as if the packet was sent by an MN, MAP or HA. The transfer method between $IP^2Ps$ can be either address switching, tunneling or secure tunneling.

HA_MN 131 is the home agent of the MN 101 in a Mobile IP (MIP) context. HA_CN 132 is the home agent of the CN 102 within a Mobile IP (NIP) context. NCPF 140 is the network control platform defined in $IP^2$. In the NCPF 140, a routing manager 141 is placed so as to manage the optimization of a routing path between MN 101 and CN 102. The routing manager 141 is a function that may be located in one or more node(s). In case that the routing manager 141 be located in a plurality of nodes as a distributed function, the routing managers 141 communicate and interact with one another. A tunnel 150 constitutes an optimized routing path between $IP^2P\_MN$ 121 and $IP^2P\_CN$ 122.

To provide route optimization with location privacy in a backward compatible way, this embodiment defines two new functions, the $IP^2$ proxy ($IP^2P$) and the NCPF 140, to be added to the MIP system. The $IP^2P$ handles route optimization. The $IP^2P$, in essence, acts as an $IP^2AR$ and can be placed, for example, in the physical access router.

The NCPF 140 is also introduced as a signaling infrastructure. The NCPF 140 used in this embodiment can be practically equal to and interwork with the mobility management parts of $IP^2$'s NCPF. One of its parts is RM 141.

The MN 101 is a legacy MIP terminal maybe with a configuration that is specific to this embodiment. The MN can decide on a per connection basis whether it requires location privacy or does not care about it. According to MIP, the MN can, at any time, send a MIPv6 Binding Update (BU) to any of the MN's CNs. This results in optimal routing, however the BU reveals the MN's location.

Thus, when the MN decides that location privacy is required, the route optimization mechanism and its related functions, defined in MIP, are not invoked even if the MN sends BUs. It may be a preferable solution that the MN 101 is be configured not to send BUs to CNs. Alternatively, $IP^2P\_MN$ 121 or other relating nodes may capture and discard the BUs, and $IP^2P\_MN$ 121 or other relating nodes may generate an activate notification (AN) to be sent to NCPF 140, based on the BUs. Then the NCPF 140 manages the route optimization in response to the ANs. However, the alternative solution can be applied if the BUs are not protected with secure method such as IPSec and a encryption. It should be noted that the BUs addressed to the HA should be passed to the HA while the BUs addressed to the CNs are discarded since the HA should know and manage the MN's location.

Although some solutions to abort sending BU are explained above, these solutions are not essential for the present invention. In other words, the present invention can be applied to the MN that sends a standard MIPv6 Binding Update to its CN. Also the MN may be configured to choose whether the MN uses MIPv6 operation regarding BU or any one of the above-described solutions.

Figure 4:
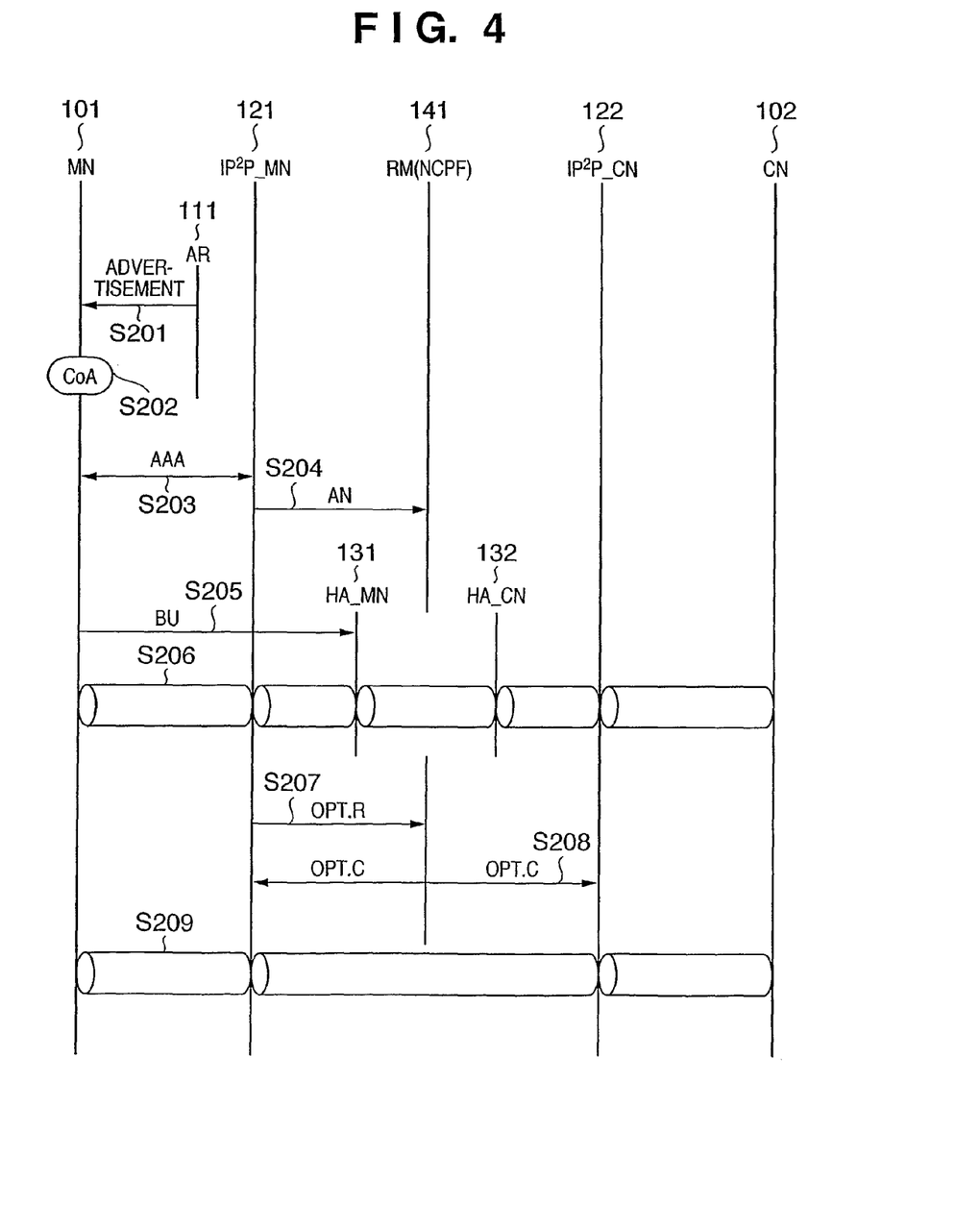
FIG. 4 shows an exemplary signal sequence of the embodiment.

FIG. 4 shows an exemplary signal sequence of the embodiment. At step S201, MN 101 receives an advertisement of a new AR 111. For example this advertisement can be a regular Router Advertisement defined in MIP.

At step S202, AR 111 of a visited network and MN 101 configure a new routing address (CoA). If applying MAP to the system, an LCoA may be configured and used instead of CoA.

At step S203, IP$^2$P (IP$^2$P_MN 121) identifies the CoA and the IPha of MN 101 from a login process or a handover process executed between MN 101 and IP$^2$P_MN 121. The login process uses Authentication, Authorization and Accounting (AAA) signalling or the like. Any signalling that securely confers the identity of the MN to the IP$^2$P is sufficient, it does not have to be AAA signalling.

At step S204, IP$^2$P_MN 121 sends an activation notification (AN) to RM 141 in NCPF 140 using IP$^2$ signalling. The notification includes the CoA, the IPha of MN 101 and the identification of IP$^2$P_MN 121. RM 141 receives the notification and stores the CoA, the IPha and the identification of IP$^2$P_MN 121 into a table. As a result, the NCPF 140 always has up-to-date information about MN-IP$^2$P relations.

At step S205, IP$^2$P_MN 121 sends a Binding Update (BU) to HA_MN 131. It should be noted that the step S205 may be done in parallel with the above-described steps.

At step S206 MN 101 starts a communication with CN 102 using bi-directional tunneling through the MN's HA 131 and the CN's HA 132 as in legacy MIP. Assuming that CN 102 is a mobile node, the path taken by the packets is MN 101→HA_MN 131→HA_CN 132→CN 102. IP$^2$P_MN 121 monitors such traffic so as to detect a trigger for a route optimization. For example, IP$^2$P_MN 121 determines whether the traffic monitored exceeds a predetermined value.

At step S207, IP$^2$P_MN 121 notifies that the trigger is detected. For example, IP$^2$P_MN 121 queries the NCPF 140 telling that a new connection is present and might be route optimized.

At step S208 NCPF 140 identifies the IP$^2$P of CN 102 and sends a command to IP$^2$P_MN 121 and IP$^2$P_CN 122. The command sets up a direct connection between IP$^2$P_MN 121 and IP$^2$P_CN 122 using the selected transfer method (e.g., tunneling). IP$^2$P_MN 121 and IP$^2$P_CN 122 receive the command, respectively. The command may be referred as a route optimization command.

At step S209, IP$^2$P_MN 121 and IP$^2$P_CN 122 establish an optimized routing path 150 based on the received command. IP$^2$P_MN 121 secures a routing address for MN 101 included in the packets, and routes the packets to CN 102 through the established routing path 150.

As a result, packets travel on the path MN 101→IP$^2$P_MN 121→IP$^2$P_CN 122→CN 102. Since the IP$^2$Ps are located in the visited network, they are closer to the MN (and CN, respectively) than the home agents. Thus, this new routing path is shorter than the one via the home agents. Further the routing address of the MN is applied in a secure manner, and therefore the location privacy of the MN is preferably protected.

If MN 101 moves to a new IP$^2$P, the new IP$^2$P updates NCPF 140. NCPF 140 will notify all the necessary IP$^2$Ps in order to maintain ongoing communications with the CNs of the moving MN 101.

As described above, the IP$^2$P is placed into any IP node where all IP traffic of a given MN is visible, such as the HMIP MAP, the AR, or the AR without HMIP.

The first solution where the IP$^2$P is placed into as the HMIP MAP, the MAPs are not (necessarily) on the same link as the MN. Therefore, IP routing is needed between the attached MN and its MAP. According to the HMIP protocol the MN maintains a bi-directional tunnel with its MAP. Since the MN requires location privacy, the MN uses a bi-directional tunnel to its HA also. This results in double tunneling between the MAP and the MN (including the air interface).

An arriving MN discovers the available MAPs and registers with a MAP by sending a binding update (BU) containing the MN's IPha and the on-link address (LCoA) to the MAP. The Home address used in the BU is the RCoA. In a public networking case, some authentication and authorization signalling is needed to secure the BU before the binding update between the MN and the MAP. As a result, the IP$^2$P in the MAP can learn the identity of the MN. This enables the IP$^2$P in the MAP to inform the NCPF about the MN's new location. We note that any signalling that securely confers the identity of the MN to the MAP is sufficient, not only AAA signalling. If no such signaling exists, then this alternative cannot be used.

Since all packets of the MN passes through the MAP (and hence the IP$^2$P) new IP connections of the given MN can be recognized in the MAP by the IP$^2$P. This enables the IP$^2$P to query the NCPF about the identity of the far end IP$^2$P (IP$^2$P_CN 122), through which the MN's CN is accessible. For instance, the IP$^2$P should maintain a table that keeps a relation between the MN (CN) and the serving IP$^2$P.

If IP$^2$P_MN 121 receives a response from RM 141 of NCPF 140, IP$^2$P_MN 121 decapsulates the IP packets sent by the MN 101 and transfers them to the far end IP$^2$P_CN 122. IP$^2$P_CN 122 receives the transferred packets and restores the packets in a way as if the CN's HA 132 had sent the packets.

This solution reduces signaling load on the IP$^2$ level since IP handovers under the same MAP are not visible to the NCPF.

The second solution, where the HMIP MAP with the IP$^2$P is placed into an AR, is similar to the one outlined in the previous embodiment. The main difference is that the MAP is placed into the IP subnet of a VN. Thus no IP routing is mandatory between the MN and the MAP. That is, the MAP also acts as an AR.

According to the third solution, where the IP$^2$P is placed into an AR, the HMIP protocol is not needed. The basic problem with this approach is that in basic MIP the MN is not in a signalling relation with the AR, since the AR is not part of the reference model in original MIPv6. Therefore this solution requires a node that is in signalling relation with the MN. In real deployment scenarios, the ARs are acting as firewalls that block unauthorized usage of the given accessed network. In this case, the MNs have to be identified by the ARs through the AAA protocol or the like between the ARs and the MNs. Since the signalling relation between the AR and the MN through the AAA protocol or the like, an IP$^2$P can be placed into the AR. IP$^2$P functionality is notified if a new MN is successfully identified and the rest of the procedure goes on as depicted by FIG. 4.

Further, the route optimization is not mandatory and is not bind by, time constraints: Initially all IP connections are passing the MN's HA. During the route optimization process data packets continue to flow through the HA as in legacy MIP. As a result, the setup for optimal routing is not time critical. This differs from the original IP$^2$, where a connection is not possible before the optimal routing is set up. Additionally the IP$^2$P may decide to omit route optimization process for some short-term IP connections (e.g., DNS queries) that do not necessarily need to be optimized.

In addition, time constraints in IP$^2$ handover might be eliminated. For instance, if the MN's IP$^2$P is changed all, IP$^2$Ps serving the given MN's and CNs have to be updated.

This is a time consuming process and communications with CNs served by un-updated $IP^2Ps$ are suspended until the update. In the HMIP protocol the MN is allowed to use more than one MAP. Additionally, in theory a MAP can serve an MN independently of its location since there is IP routing between them. In a combined system ($IP^2$+HMIP), after a handover, the old MAP containing the old $IP^2P$ can be kept and used as long as the updating of far end IP2Ps is in progress.

In addition it may also reduce the air interface overhead. If the $IP^2P$ and the MN are placed in the same VN no tunneling is needed between the $IP^2P$ and the MN including the air interface. However, an extension is needed for the MIP signalling to inform the MN about this possibility. Thus, the implementation on the MN's side has to be modified in order to enable un-encapsulated data communication on the air interface.

Figure 5:
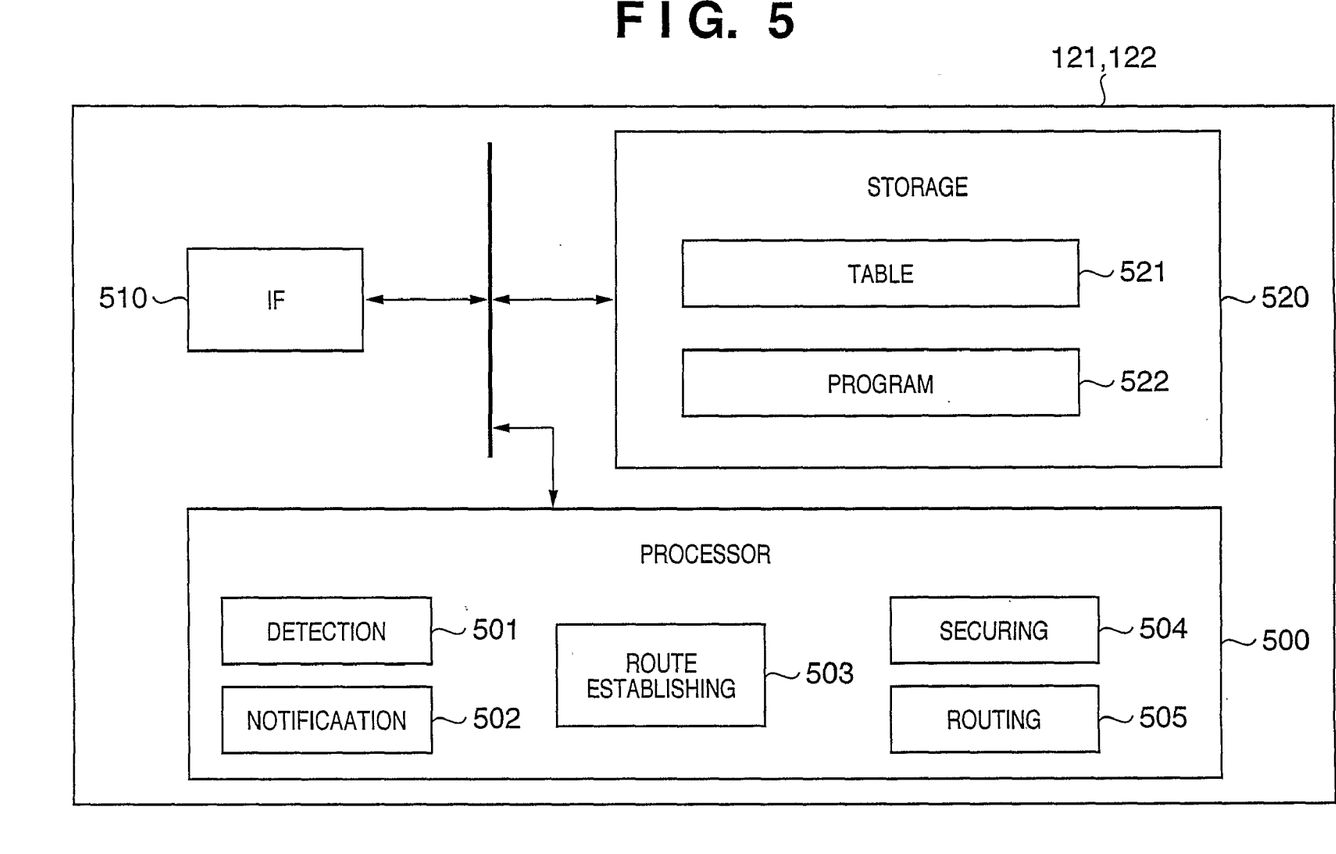
FIG. 5 shows an exemplary block diagram illustrating basic components of the proxy node in the preferred embodiments.

FIG. 5 is an exemplary block diagram illustrating the basic components of the proxy node in the preferred embodiments. In the figure, a processor unit 500 is the main unit of the proxy node and can be configured by logic circuits and/or a CPU with computer programs. The processor unit 500 includes, for example, a detection unit 501, a notification unit 502, a route establishing unit 503, a securing unit 504 and a routing unit 505. The processor unit 500 may further include an identification unit that identifies the MN through an authentication process of the mobile unit when the MN is attached to the proxy node.

The detection unit 501 detects a trigger for a packet route optimization based on monitoring results of traffic or the type of connection. For example, if the determination unit, which may be included in the detection unit 501, determines that the traffic monitored exceeds a predetermined value, the trigger is detected. Alternatively the detection unit 501 may detect the trigger based on a type of connection established by the MN.

The notification unit 502 notifies the routing manager of the detected trigger. The notification unit 502 may send the arrival notification to RM 141 using IF unit 510. The IF unit 510 is an IP packet sending/receiving circuit.

The route-establishing unit 503 establishes the optimized routing path according to a command received from the routing manager. The command is received by the IF unit 510 using the $IP^2$ signalling.

The securing unit 504 secures a routing address for the packets from the MN. An address switching method, tunneling method, or secure tunneling method is employed for hiding, masking and/or protecting the routing address. The routing address in this embodiment can show the actual location of the MN. Examples are the CoA, LCoA or RCoA. In addition, the routing address is different from the home address (IPha). The securing unit 504 may comprise an order-receiving unit that receives a privacy from the MN or other node which is in relation with the MN. The privacy order relates to whether the routing address of the packets should be secured or not.

Further, the securing unit 504 may comprise a decapsulating unit which decapsulates the packet encapsulated by the MN and an encapsulating unit that encapsulates the packet decapsulated by the decapsulating unit to then route the packet through the optimized routing path.

The routing unit 505 routes the packets secured by the securing unit 504 to correspondent node (CN 102) through the established routing path 150. The routing unit 505 may route un-secured packets.

The storage unit 520 stores the table 521 and a computer program 522, and can be configured as a flash memory, RAM and/or hard disk drive. The table 521 is used for the route establishing process an/or the routing process. The program may be used by the processor unit 500 to realize the detection unit 501 or the like.

Figure 6:
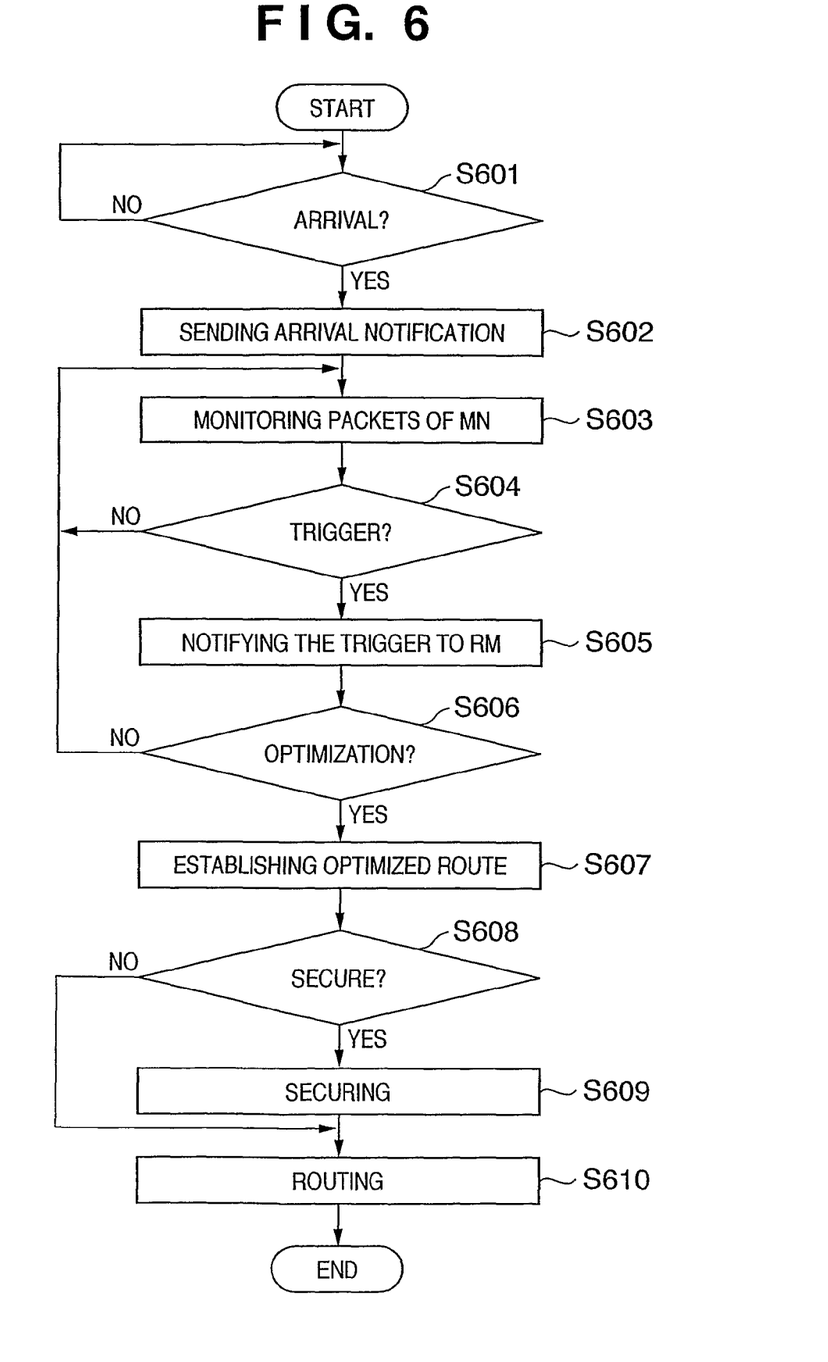
FIG. 6 shows a flowchart illustrating a routing process of the exemplary embodiments.

FIG. 6 is a flowchart illustrating a routing process of the exemplary embodiments.

At step S601, the processor unit 500 determines whether a new MN has arrived or not. The arrival of the MN, the routing address (e.g. CoA, LCoA or RCoA) and the home address (IPha) of the MN are identified through the AAA signalling. In case of arrival, the process reaches the next step. If not, the processor unit 500 waits for the arrival.

At step S602, the processor unit 500 sends the arrival notification to RM 141 using $IP^2$ signalling.

At step S603, the detection unit 501 monitors traffic of packets related to the MN.

At step S604, the detection unit 501 detects the trigger for route optimization from the traffic. As described above, the trigger may be detected based on the type of connection established to the MN. If the trigger is detected, the process reaches the next step S605. If not, the process goes back to step S603.

At step S605, the notification unit 502 notifies RM 141 that the trigger has been detected.

At step S606, the processor unit 500 determines whether an optimization command is received from the RM or not. If the optimization command is received, the process reaches step S607. If not, the process goes back to step S603.

At step S607, the route-establishing unit establishes the optimized packet route according to the received command.

At step S608, the securing unit 504 determines whether the routing address of the MN's packets should be secured or not, based on the privacy order of the MN or the type of connection. If applying the privacy order, the securing unit further includes an order-receiving unit that receives a privacy order from the mobile node. The privacy order relates to whether the routing address of the packets should be secured or not. In addition, the MN should include a decision unit which decides whether the routing address of the packets should be secured or not; and an order-sending unit to send the privacy order to the proxy node based on the decision of the decision unit. If it should be secured, the process reaches step S609. If not, the process reaches step S610.

At step S609, the securing unit 504 applies a securing process to packets. The securing process is to protect the location privacy of the MN using the address switching method, the tunneling method, or the secure tunneling method. If the tunneling method is employed, the securing unit decapsulates the packet encapsulated by the MN and encapsulates the decapsulated packet again. The header of the original packet generated in the MN has the IPha of the MN as a source address and the IPha of the CN as a destination address. After encapsulation at the MN, another (tunnel) header is added to the packet. The tunnel header has the CoA of the MN as its source address and the IPha of the CN as its destination address. The tunnel header is removed at the $IP^2P$, and another (tunnel) header is added. The added header has the IP address of the $IP^2P$ of MN as its source address and the IP address of the $IP^2P$ of CN as its destination address. The added header is removed at the $IP^2P$ of CN, and the packet is routed based on the original header. Through these securing processes, the CoA of the MN is not revealed to the CN.

At step S610, the routing unit 505 routes the packets.

As described-above, the present invention provides some solution combining the $IP^2$ architecture with the MIP/HMIP system. As a result, route optimization with location privacy is performed by the IP2 protocol. However, constraints remain such that the resulting solution shall be backward compatible with the MIP/HMIP protocols and the MIP/HMIP enabled MNs shall not be modified to preserve MIP/HMIP signaling.

Although several embodiments of the method, apparatus and system of the present invention have been illustrated in the accompanying drawings and described in the foregoing description, it shall, be understood that the invention is not limited to the embodiments disclosed, but is capable of numerous rearrangements, modifications and substitutions without departing from the spirit of the invention as set forth and defined by the following claims.

The invention claimed is:

1. A communication system including an IP Backbone (IP_BB) the communication system including:
a mobile node communicating with a correspondent node;
a home agent node managing the mobile node and relaying packets sent from the mobile node to the correspondent node;
a proxy node being located closer to the mobile node than the home agent node for relaying the packets from the mobile node to the home agent node;
a corresponding proxy node for restoring and relaying packets to the correspondent node, and a Network Control Platform (NCPF) including a routing manager managing a route of the packets, the proxy node comprising:
a detection unit for detecting a trigger of a packet route optimization;
a notification unit for notifying the routing manager of the detected trigger;
a route-establishing unit for establishing the optimized routing path using an address switching method according to a command received from the routing manager;
a securing unit for securing a routing address for the packets, the routing address being dynamically allocated to the mobile node; and
a routing unit for routing the packets secured by the securing unit to the corresponding proxy node through the established optimized routing path, the routing manager sending the command to establish an optimized routing path between the proxy node serving the mobile node and another proxy node serving the correspondent node when the trigger is notified, and the mobile node comprising:
a deciding unit for deciding whether a routing address privacy is required or not; and
a sending unit for sending a Binding Update to the correspondent node so as to reveal the routing address when said deciding unit decided that the routing address privacy is not required.

2. The communication system claimed in claim 1, the detection unit:
monitoring traffic of the packets; and
determining whether the traffic monitored exceeds a predetermined value.

3. The communication system claimed in claim 1, wherein the securing unit detects the trigger based on a type of a connection established by the mobile node.

4. The communication system claimed in claim 1, the proxy node:
receiving the Binding Update from the mobile node; and
discarding the Binding Update so as to keep the routing address privacy.

5. The communication system claimed in claim 4, the proxy node:
generating an activate notification (AN) based on the received BU; and
sending the AN to the NCPF for the route optimization.

6. The communication system claimed in claim 4, the proxy node passing the BU addressed to the home agent node of the mobile node without discarding the BU.

7. The communication system claimed in claim 6, wherein the mobility access point is placed into an IP subnet of a visited network of the mobile node.

8. The communication system claimed in the claim 1, the securing unit:
decapsulating the packet encapsulated by the mobile node; and
encapsulating the packet decapsulated by the decapsulating unit to route the packet through the optimized routing path.

9. The communication system claimed in claim 8, wherein the mobile node communicates with the proxy node using an un-encapsulated packet when the mobile node and the proxy node are in the same IP subnet.

10. The communication system claimed in claim 1, the proxy node identifying the mobile node through an authentication process of the mobile unit when the mobile node is attached to the proxy node.

11. The communication system claimed in claim 1, wherein the proxy node is installed in a mobility access point of hierarchical mobile IP.

12. The communication system claimed in claim 1, wherein the mobile node keeps and uses an old proxy node as long as a handover updating process is in progress.

13. A method for a packet communication in a system including an IP Backbone (IP-BB) having a plurality of router nodes, and a Network Control Platform (NCPF) controlling the IP-BB, the IP-BB including: a mobile node for communicating with a correspondent node; a home agent node for managing the mobile node and relaying packets sent from the mobile node to the correspondent node; a proxy node, located closer to the mobile node than the home agent node, relaying the packets from the mobile node to the home agent node; and a corresponding proxy node for restoring and relaying packets to the correspondent node, and the NCPF including a routing manager managing a route of the packets; the method comprising the steps of:
detecting a trigger for a packet route optimization at the proxy node; and
notifying the routing manager of the detected trigger;
sending a command from the routing manager to the proxy node to establish an optimized routing path between the proxy node serving the mobile node and the corresponding proxy node serving the correspondent node when the trigger is notified at the routing manager,
establishing the optimized routing path using an address switching method according to the command received from the routing manager;
securing a routing address for the packets, the routing address being dynamically allocated to the mobile node;
routing the packets secured to the corresponding proxy node through the established routing path,
deciding whether a routing address privacy is required or not; and
sending a Binding Update from the mobile node to the correspondent node so as to reveal the routing address when it is decided that the privacy is not required.

14. A proxy node employed in a communication system including an IP Backbone (IP-BB) having a plurality of router nodes, and a Network Control Platform (NCPF) controlling the IP-BB, the IP-BB including: a mobile node communicating with a correspondent node; a home agent node managing the mobile node and relaying packets sent from the mobile node to the correspondent node; a proxy node being located closer to the mobile node than the home agent node and relaying the packets from the mobile node to the home agent node; and a corresponding proxy node for restoring and relaying packets to the correspondent node, the NCPF including a routing manager managing a route of the packets;

the proxy node comprising:

a detection unit for detecting a trigger of a packet route optimization;

a notification unit for notifying the routing manager of the detected trigger;

a route-establishing unit for establishing the optimized routing path using an address switching method according to a command received from the routing manager;

a securing unit for securing a routing address for the packets, the routing address being dynamically allocated to the mobile node;

a routing unit for routing the packets secured by the securing unit to correspondent node through the established optimized routing path; and a passing unit for passing a Binding Update to the correspondent node to reveal the routing address when a routing address privacy is not required.

* * * * *

UNITED STATES PATENT AND TRADEMARK OFFICE
CERTIFICATE OF CORRECTION

| | |
|---|---|
| PATENT NO. | : 7,965,695 B2 |
| APPLICATION NO. | : 12/376930 |
| DATED | : June 21, 2011 |
| INVENTOR(S) | : Valko et al. |

It is certified that error appears in the above-identified patent and that said Letters Patent is hereby corrected as shown below:

In Column 1, Line 24, delete "IP-BE" and insert -- IP-BB --, therefor.

In Column 2, Line 44, delete "NIP" and insert -- MIP --, therefor.

In Column 3, Line 4, delete "NIP" and insert -- MIP --, therefor.

In Column 3, Line 19, delete "prosy" and insert -- proxy --, therefor.

In Column 4, Line 19, delete "(NIP)" and insert -- (MIP) --, therefor.

In Column 4, Lines 35-38, delete "The NCPF........RM 141." and insert the same at Line 34, after "router.", as a continuation of the paragraph.

In Column 6, Line 56, delete "by," and insert -- by --, therefor.

In Column 8, Line 1, delete "an/or" and insert -- and/or --, therefor.

In Column 9, Line 7, delete "shall," and insert -- shall --, therefor.

In Column 9, Line 48, in Claim 1, delete "deciding unit" and insert -- decision unit --, therefor.

In Column 9, Line 50, in Claim 1, delete "sending unit" and insert -- order-sending unit --, therefor.

In Column 9, Line 52, in Claim 1, delete "deciding unit" and insert -- decision unit --, therefor.

Signed and Sealed this
Thirteenth Day of December, 2011

David J. Kappos
*Director of the United States Patent and Trademark Office*

CERTIFICATE OF CORRECTION (continued)
U.S. Pat. No. 7,965,695 B2

In Column 9, Line 61, in Claim 3, delete "securing unit" and insert -- detection unit --, therefor.

In Column 10, Line 12, in Claim 8, after "in" delete "the".